United States Patent Office 3,139,416
Patented June 30, 1964

3,139,416
PRODUCTION OF NOVEL POLYMERIC COMPOUNDS
Peter Brian Lumb and Nikolai Stoyanov Nikolov, Sarnia, Ontario, Canada, assignors to Polymer Corporation Limited, Sarnia, Ontario, Canada, a body corporate and politic
No Drawing. Filed June 5, 1961, Ser. No. 114,632
Claims priority, application Canada June 11, 1960
17 Claims. (Cl. 260—66)

This invention relates generally to the production of polymer chains having terminal hydroxyl groups and to the products so produced. It relates particularly to a method for producing hydroxyl terminated polymeric chains of vinyl aromatic compounds.

It is well known that certain vinyl compounds can be polymerized using alkali metals and organo-compounds of alkali metals. This type of polymerization is generally referred to by those skilled in the art as anionic polymerization and the better known initiators of such polymerization are organosodium compounds such as sodium butyl, sodium benzyl, sodium amide and Grignard reagents. Other similar compounds which may be used are various organo-compounds of the other alkali metals as well as alkali metals themselves or their solutions in liquid ammonia. The mechanism is generally characterized by a process in which the initiator transfers an electron to the monomer thus producing a unit which contains a carbanion. "Carbanion" is the term applied to a negatively charged carbon atom and the presence of carbanions in solution is generally manifested by a characteristic colour. The chain ends are associated with an alkali metal. A description of the mechanism by which this polymerization takes place has been published by Flory, Principles of Polymer Chemistry, Cornell University Press, New York, 1953, pages 224-5.

It is now widely recognized that when anionic polymerization is carried out in a suitable system, the polymer may be maintained in an active or "living" condition. For example, when butadiene is polymerized by contacting it with an ether solution of lithium butyl, further amounts of butadiene may be added and polymerized to produce a still higher molecular weight polybutadiene. It is also known that when styrene is brought into contact with an ether solution of a sodium naphthalene complex, the styrene polymerizes to a polymer containing terminal negatively charged carbon atoms often evidenced by the reddish colour of negative styryl ions. Additional styrene will also polymerize provided the terminal carbanions are not destroyed as they may be by contact with air or water. Similarly, it is well known that amyl sodium and phenyl sodium will effect the polymerization of styrene. In the use of these ionic polymerization catalysts, it is conventional practice once the desired conversion has been achieved to contact the reaction mixture with a compound such as alcohol or water which stops further polymerization by reacting with the terminal carbanion. Such a process results in the production of polymer chains which do not have reactive terminal groups.

The object of the present invention is to provide a process for placing terminal hydroxyl units on polymer chains of vinyl aromatic compounds.

In its narrower aspects, it is the object to produce polymer chains having a hydroxyl unit on each end thereof.

The present invention is based on the discovery that polymers of certain vinyl aromatic compounds, when polymerized in an anionic system such as in the presence of alkali metals or organo-compounds of alkali metals, can be reacted with certain aldehydes and ketones to form a product which on reaction with a proton donor produces chains having terminal hydroxyl units.

The objects of the invention are achieved by the process of producing polymer chains having terminal hydroxyl groups which comprises terminating the active polymer produced by anionic polymerization of a vinyl aromatic compound represented by the formula

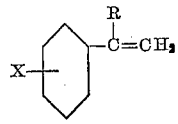

where X is selected from the group consisting of H and alkyl hydrocarbon radicals having 1–4 carbon atoms and R is selected from the group consisting of H and alkyl hydrocarbon radicals having 1–2 carbon atoms by reaction with a terminating agent having the formula

in which $R^1$ is selected from the group consisting of H, alkyl hydrocarbon radicals and phenyl radicals and $R^2$ is selected from the group consisting of H and alkyl hydrocarbon radicals, and contacting the product of such termination reaction with a proton donor.

The polymeric chains on which terminal hydroxyl units are placed in the practice of the present invention are produced by anionic polymerization using, as initiators, alkali metals or organo-compounds of alkali metals. The polymerization is conveniently carried out in a diluent which must be non-reactive although the presence of a diluent is not essential in the practice of the invention. The terminal carbanions produced in these polymerization systems must be maintained in an active condition until reacted with the terminating agents. The initiating agents may be metallic lithium, sodium or potassium or they may be hydrocarbon compounds of these alkali metals. The hydrocarbon compounds are preferably those having from about 1–40 carbon atoms in which the alkali metal has replaced hydrogen. Examples of such compounds include metal alkyls such as methyl sodium, ethyl sodium, butyl sodium as well as higher alkyls of sodium and the other alkali metals. There may also be used unsaturated compounds such as allyl sodium, methallyl sodium and the like as well as addition compounds of alkali metals with olefinic hydrocarbons such as isoprene, styrene, alpha-methylstyrene and the like. In addition to the aliphatic hydrocarbon compounds, there may be used aryl, alkaryl and aralkyl alkali metal compounds such as phenyl sodium, sodium biphenyl, sodium naphthalene, sodium phenanthrene, sodium anthracene and the like. Dialkali metal compounds which may be used are various alkylene dialkali metal compounds such as methylene disodium, ethylene disodium, trimethylene disodium and the like as well as 1,4-disodium benzene, 1,5-disodium naphthalene or 1,2-disodium-1,3 diphenyl propane. In the above-listed compounds it should be understood that sodium can be replaced by lithium or potassium.

The variety of initiators which may be used is thus seen to be quite extensive and the preferred initiator for a particular system may be readily selected by those skilled in the art of anionic polymerization. For instance, the initiators formed between alkali metals and olefinic hydrocarbons do not necsessarily have one metal atom associated with only one molecule of the olefinic hydrocarbon. For example, a polymer of isoprene may be prepared using metallic sodium, butyl sodium, phenyl lithium, and the like, and the active polymer so produced containing terminal carbanions may be used as initiator for the polymerization of vinyl aromatic compounds to produce the polymers which are then terminated according to the present invention. On the other hand, it has been well established that when alpha-methyl styrene is polymerized in an ether such as tetrahydrofuran at room temperature and in the presence of metallic sodium, the resulting product is sodium alpha-methyl styrene tetramer. But when the reaction is carried out at lower temperatures a high molecular weight polymer of alpha-methyl styrene may be produced.

Some of the organo-metallic compounds produce polymer chains which grow in only one direction while others initiate chains which grow from both ends. For example, an alkyl sodium such as butyl sodium produces chains which are active on only one end, while metallic sodium, alkylene disodium compounds such as pentamethylene disodium, and the addition compounds of sodium with polycyclic aromatic hydrocarbons, such as sodium naphthalene produce chains which are active on both ends. For this reason, the practice of the present invention results in polymer chains having either one or two terminal hydroxyl units depending upon the particular initiator system used in the polymerization process. The initiators which are particularly useful in the practice of the present invention are the addition products of alkali metals and polycyclic aromatic hydrocarbons since these are soluble in ethers and can be used to produce polymers of controlled narrow molecular weight distribution.

Various compounds may be used as the diluent in which polymerization is carried out and the choice depends upon the particular initator used. Ethers are used for example when the initiator system is comprised of the addition compound of sodium with a polycyclic hydrocarbon since this type of organo-metallic initiator is not formed in a hydrocarbon diluent. However the ether may be used in conjunction with a hydrocarbon such as benzene, toluene, butane, pentane and the like provided sufficient ether is used to maintain the initiator in solution. Ethers having low freezing points such as tetrahydrofuran, dioxane, dimethyl ether, and dimethyl glycol ether, and mixtures thereof are especially useful. On the other hand when the initiator system is comprised of metallic sodium or an alkyl or aryl sodium compound such as butyl sodium, pentyl sodium, pentamethylene disodium, benzyl sodium, phenyl sodium and the like, various hydrocarbons such as benzene, toluene, butane, pentane, hexane and the like can be used as well as ethers. Liquid ammonia may also be used as a diluent with metallic lithium and has a particular advantage in the easy recovery of the diluent. The preferred diluent for any particular system may be readily determined.

There are no critical temperature limits for the anionic polymerization of the vinyl aromatic compound although it is undesirable to operate at very high temperatures due to the pressure of the monomer at such temperatures, and the operation of the polymerization equipment becomes difficult at extremely low temperatures. For these reasons it is generally desirable to carry out the polymerization at temperatures below about +60° C. and temperatures as low as −120° may be used. It is most convenient to use a temperature between about +30° C. and −80° C.

The polymers which are terminated with hydroxyl units in the practice of the present invention are those prepared from vinyl aromatic compounds as described above and include styrene, p-methylstyrene, alpha-methylstyrene and the like.

In the practice of the invention, the active polymer chains are reacted with a compound which may be represented by the general formula $R^1R^2C=O$ in which $R^1$ is selected from the group consisting of H, alkyl hydrocarbon radicals and phenyl radicals, and $R^2$ is selected from the group consisting of H and alkyl hydrocarbon radicals. These compounds are herein referred to in the disclosure and claims as terminating agents and their reaction with the active polymer, a termination reaction. Examples of the terminating agents include aldehydes such as formaldehyde, acetaldehyde, propionaldehyde, butylaldehyde, valeraldehyde (pentanol), benzaldehyde and the like. Also, included are ketones such as dimethyl ketone (acetone), ethylmethyl ketone, diethyl ketone, methylpropyl ketone, isopropylmethyl ketone, as well as ketones containing other alkyl radicals. The preferred terminating agents are those in which $R^1$ is selected from the group consisting of H, a methyl radical and a phenyl radical and $R^2$ is selected from the group consisting of H and a methyl radical. The preferred aldehydes are formaldehyde, acetaldehyde and benzaldehyde and the preferred ketone is acetone.

It is preferable that the terminating agent be added to the active polymer as soon after its production as possible although this is not essential providing the polymer is maintained in its active condition until such addition is effected. It is essential for best results that the terminating agent be as free as possible of impurities which react with the terminal carbanions. The termination reaction may be carried out at any convenient temperature, although it proceeds more rapidly at higher temperatures. A convenient temperature range is between about −25° C. and +60° C. with a range from about 0° C. to 60° C. being preferred. A suitable temperature for a particular system can be readily determined by those skilled in the art. For example, when paraformaldehyde is used as a source of formaldehyde, it is desirable to operate at an elevated temperature such as 50° C. in order to decompose the paraformaldehyde. Theoretically, the amount of terminating agent required is simply one molecule for each active chain end. In practice, however, it is desirable for best results to use an excess, for example, double the molar requirement. The progress of the reaction is marked by a fading of the characteristic colour of the active polymers.

After the termination reaction is complete, the product is then treated with a proton donor such as alcohol, water or a mineral acid which finally converts the active terminal units to hydroxyl units. The latter reaction is carried out before the product of the termination reaction is allowed to contact air or oxygen.

Once the terminal groups have been converted to hydroxyl units, the polymers may be recovered by conventional methods. For instance, the solvent may be evaporated from the solution, or the polymer may be precipitated with an excess of a non-solvent such as methanol and recovered and dried in the usual way.

The hydroxylated polymers produced according to the invention may be used in various ways which utilize the reactivity of the hydroxyl unit. For example, those in which the polymer chains contain a hydroxyl group on each end, i.e., the dihydroxylated polymers, may be used in any of the many different ways developed for use with polyethers and polyesters. For example, they may be linked or chain extended with organic diisocyanates. Such chain extended compounds contain active hydrogen and may be cross-linked by means of additional diisocyanate to give a product containing substantially no unattached chain ends.

Since even low molecular weight polymers of vinyl aromatic compounds are solid in nature, the chain extension is most conveniently carried out in solution in a suitable solvent such as benzene or toluene. In this process the polymer is reacted with a polyisocyanate, which links the chains together through the terminal hydroxyl units to produce a solid mass containing very long chains. Either aliphatic or aromatic polyisocyanates can be used and examples of such compounds are the 1,3-substituted propylene diisocyanate, the 1,5-substituted pentylene-1 diisocyanate, the 1,4-substituted cyclohexylene-1 diisocyanate, toluene 2,4-diisocyanate, ethylbenzene 2,4,6-triisocyanate and the like. The reaction may be carried out in the presence of basic catalytic compounds which accelerate the reaction. The preferred catalytic compounds for this purpose are oil soluble aliphatic and aromatic tertiary amines such as triethyldiamine, dimethylaniline, morpholine, N-methyl morpholine, pyridine and the like.

After the initial reaction of the hydroxylated polymer with the polyisocyanate, water may be added to react with the excess polyisocyanate to produce carbon dioxide which serves as blowing agent for a foam and to simultaneously produce a polyamine which forms cross-links between the isocyanate portion of the chains.

The following examples will permit a better understanding of the invention and will serve to illustrate the best means of practicing it. The polymerization reactions were carried out in a glass reaction vessel under anhydrous conditions and in the absence of air using anhydrous solvents and freshly distilled styrene.

*Example I*

A catalyst solution was prepared by dissolving alpha-methyl styrene in tetrahydrofuran in a 100 cc. flask, evacuating the flask under a vacuum of about $10^{-4}$ mm. Hg, freezing the solution by immersion of the flask in liquid nitrogen, degassing by pumping and finally transferring the solution, while maintaining the vacuum, into a glass receiver containing sodium having a bright clean surface. The transfer was made without admitting air or water. The resulting catalyst solution contained $6.7 \times 10^{-4}$ moles of sodium-alpha-methylstyrene tetramer per cc. of solution and was a dark red in colour.

50 ccs. of tetrahydrofuran were dried over calcium hydride and distilled into a 500 cc. reaction flask. Catalyst solution was then added dropwise until a faint yellow colour appeared. Then a further 8.5 ccs. of catalyst solution were added followed by 10 grams of styrene which were distilled into the flask at about 0° C. The flask was maintained at about 0° C. for about thirty minutes. 1 cc. of acetaldehyde which had been dried over calcium sulfate and degassed was added and the temperature raised to ambient. The solution discoloured rapidly after which a few ccs. of methanol acidified with hydrochloric acid were added while maintaining the system under vacuum. The reaction flask was then opened to the atmosphere and the polymer precipitated by the addition of alcohol and vacuum dried at about 50° C. The intrinsic viscosity ($\eta$) of the product was determined in toluene at 30° C. and found to be 0.135. Using the relationship between ($\eta$) and molecular weight, M, which has been established for these polymers, $(\eta) = 1.6 \times 10^{-4} M^{0.74}$, the molecular weight was calculated to be 9,000.

The polymer was analyzed for active hydrogen atoms by the standard Zerewitinoff test as described by Kohler in J. Am. Chem. Soc. 49, 318 (1927), and showed the presence of 2.0 hydroxyl groups per molecule based on a molecular weight of 9000. It appears, therefore, that on the average each polymer molecule contains two terminal hydroxyl groups.

*Example II*

The procedure described in Example I was repeated except that formaldehyde was used as the terminating agent instead of acetaldehyde. The formaldehyde was added by heating paraformaldehyde gently in the absence of air and condensing formaldehyde vapours on the surface of the reaction mixture while the latter was maintained at 0° C. The temperature of the mixture was raised to ambient whereupon rapid discolouration of the mixture occurred.

The intrinsic viscosity of the product was found to be 0.14, corresponding to a molecular weight of 9,500. Zerewitinoff analysis indicated 2.4 hydroxyl groups per molecule based on this molecular weight.

*Example III*

The procedure described in Example I was repeated except that styrene was added to the reaction flask in solution in tetrahydrofuran from a sealed ampoule and 1 cc. of acetone, dried over calcium sulfate was used as the terminating reagent. The intrinsic viscosity of the product was found to be 0.163 which corresponds to a molecular weight of 11,000. Zerewitinoff analysis indicated 1.2 hydroxyl units per molecule.

We claim:
1. The process of producing polymer chains having terminal hydroxyl units which comprises terminating the active polymer produced by anionic polymerization of a vinyl aromatic compound represented by the formula

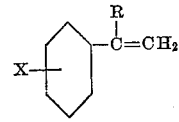

where X is selected from the group consisting of H and alkyl hydrocarbon radicals having 1–4 carbon atoms and R is selected from the group consisting of H and alkyl hydrocarbon radicals having 1–2 carbon atoms by reaction with a terminating agent having the formula

in which $R^1$ is selected from the group consisting of H, alkyl hydrocarbon radicals and phenyl radicals and $R^2$ is selected from the group consisting of H and alkyl hydrocarbon radicals, and contacting the product of said termination reaction with a proton donor selected from the group consisting of alcohols, ethers and acids, said process carried out in the absence of oxygen.

2. A process according to claim 1 in which said vinyl aromatic compound is styrene.

3. The process of producing polymer chains having terminal hydroxyl units which comprises, polymerizing a vinyl aromatic compound represented by the formula

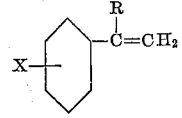

where X is selected from the group consisting of H and alkyl hydrocarbon radicals having 1–4 carbon atoms and R is selected from the group consisting of H and alkyl hydrocarbon radicals having 1–2 carbon atoms in the presence of an alkali metal hydrocarbon compound, reacting the active polymer so formed with a terminating agent having the formula

in which $R^1$ is selected from the group consisting of H, alkyl hydrocarbon radicals and phenyl radicals and $R^2$ is selected from the group consisting of H and alkyl hydrocarbon radicals, and contacting the product of said termination reaction with a proton donor selected from the group consisting of alcohols, ethers and acids, said process carried out in the absence of oxygen.

4. A process according to claim 3 in which the vinyl aromatic compound is polymerized by contacting it with said alkali metal hydrocarbon in the presence of an ether.

5. The process of producing polymer chains having terminal hydroxyl units which comprises, polymerizing a vinyl aromatic compound represented by the formula

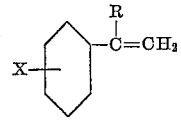

where X is selected from the group consisting of H and alkyl hydrocarbon radicals having 1–4 carbon atoms and R is selected from the group consisting of H and alkyl hydrocarbon radicals having 1–2 carbon atoms in the presence of an alkali metal hydrocarbon compound, reacting the active polymer so formed with a terminating agent having the formula

in which $R^1$ is selected from the group consisting of H, alkyl hydrocarbon radicals and $R^2$ is a methyl radical, and contacting the product of said termination reaction with a proton donor selected from the group consisting of alcohols, ethers and acids, said process carried out in the absence of oxygen.

6. The process of producing polymer chains having terminal hydroxyl units which comprises, polymerizing a vinyl aromatic compound represented by the formula

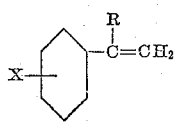

where X is selected from the group consisting of H and alkyl hydrocarbon radicals having 1–4 carbon atoms and R is selected from the group consisting of H and alkyl hydrocarbon radicals having 1–2 carbon atoms in the presence of an alkali metal hydrocarbon compound, reacting the active polymer so formed with acetone, and contacting the product of said termination reaction with a proton donor selected from the group consisting of alcohols, ethers and acids, said process carried out in the absence of oxygen.

7. A process according to claim 5 in which the polymerization reaction is carried out in the presence of an ether.

8. A process according to claim 6 in which the polymerization reaction is carried out in the presence of an ether.

9. The process of producing polystyrene in which the polymer chains contain terminal hydroxyl units which comprises, polymerizing styrene in the presence of an alkali metal hydrocarbon while dispersed in a non-reactive liquid medium, terminating the active polymer so formed by reaction with a terminating agent having the formula

in which $R^1$ is selected from the group consisting of H, a methyl radical and a phenyl radical and $R^2$ is selected from the group consisting of H and a methyl radical, and contacting the product of said termination reaction with a proton donor selected from the group consisting of alcohols, ethers and acids, said process carried out in the absence of oxygen.

10. A process according to claim 9 in which said alkali metal hydrocarbon is the addition product of an alkali metal and a polycyclic aromatic hydrocarbon.

11. A process according to claim 9 in which said alkali metal hydrocarbon is the addition product of sodium and a polycyclic aromatic hydrocarbon.

12. A process according to claim 10 in which said polycyclic aromatic hydrocarbon is the tetramer of alpha-methylstyrene.

13. A process according to claim 11 in which said polycyclic aromatic hydrocarbon is the tetramer of alpha-methylstyrene.

14. The process of producing polystyrene in which the polymer chains contain terminal hydroxyl units which comprises polymerizing styrene in the presence of the addition product of an alkali metal and a polycyclic aromatic hydrocarbon while dispersed in a non-reactive liquid medium comprising an ether, terminating the active polymer so formed by reaction with a terminating agent having the formula

in which $R^1$ is selected from the group consisting of H, a methyl radical and a phenyl radical and $R^2$ is selected from the group consisting of H and a methyl radical, and contacting the product of said termination reaction with a proton donor selected from the group consisting of alcohols, ethers and acids, said process carried out in the absence of oxygen.

15. A process according to claim 14 in which said ether is tetrahydrofuran.

16. A process according to claim 14 in which said polycyclic aromatic hydrocarbon is the tetramer of alpha-methylstyrene.

17. A process according to claim 16 in which the alkali metal is sodium.

References Cited in the file of this patent

UNITED STATES PATENTS 2,835,658    Lang _____ May 20, 1958

FOREIGN PATENTS 620,326    Canada _____ May 16, 1961